(No Model.)  2 Sheets—Sheet 1.

S. McADOO.
PIPE TURNER.

No. 566,996.  Patented Sept. 1, 1896

Witnesses:
Walter Kamasies
Samuel S. Mehard

Inventor.
Samuel McAdoo,
by Wm L. Pierce,
his Attorney (No Model.) 2 Sheets—Sheet 2.
S. McADOO.
PIPE TURNER.
No. 566,996. Patented Sept. 1, 1896.
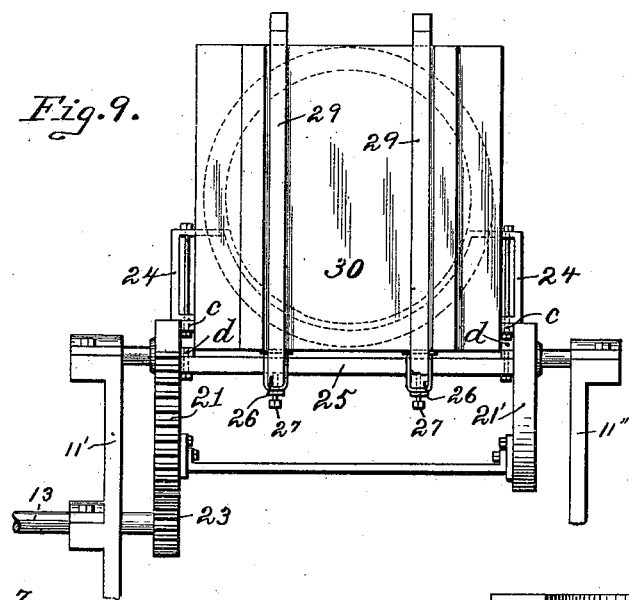
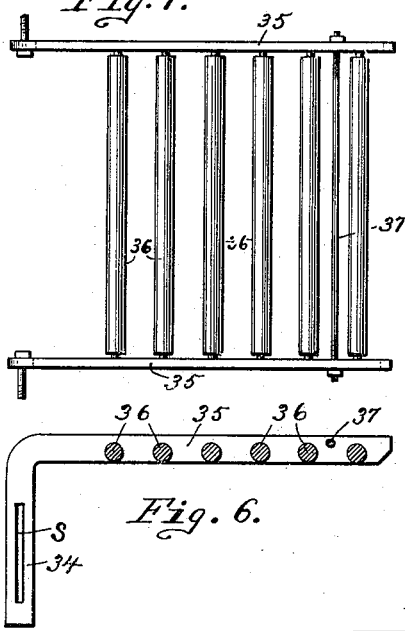
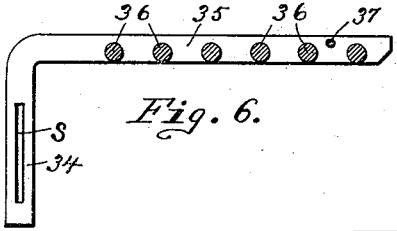
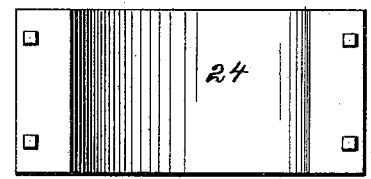
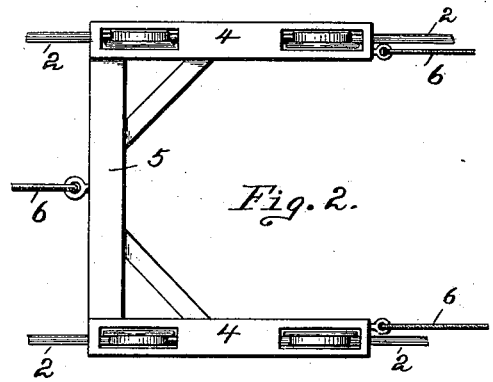
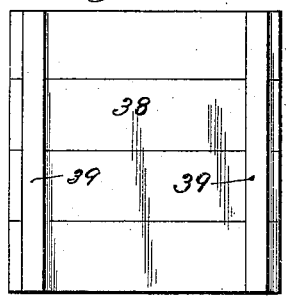
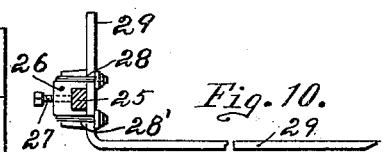
Witnesses:
Walter Tamarise
Samuel S. McHard
Inventor:
Samuel McAdoo,
by Wm. L. Pierce,
his Attorney

UNITED STATES PATENT OFFICE.

SAMUEL McADOO, OF TORONTO, OHIO.

PIPE-TURNER.

SPECIFICATION forming part of Letters Patent No. 566,996, dated September 1, 1896.

Application filed October 23, 1895. Serial No. 566,635. (No model.)

*To all whom it may concern:*

Be it known that I, SAMUEL MCADOO, a citizen of the United States, residing at Toronto, in the county of Jefferson and State of Ohio, have invented or discovered new and useful Improvements in Pipe-Turners, of which the following is a specification.

Figure 1:
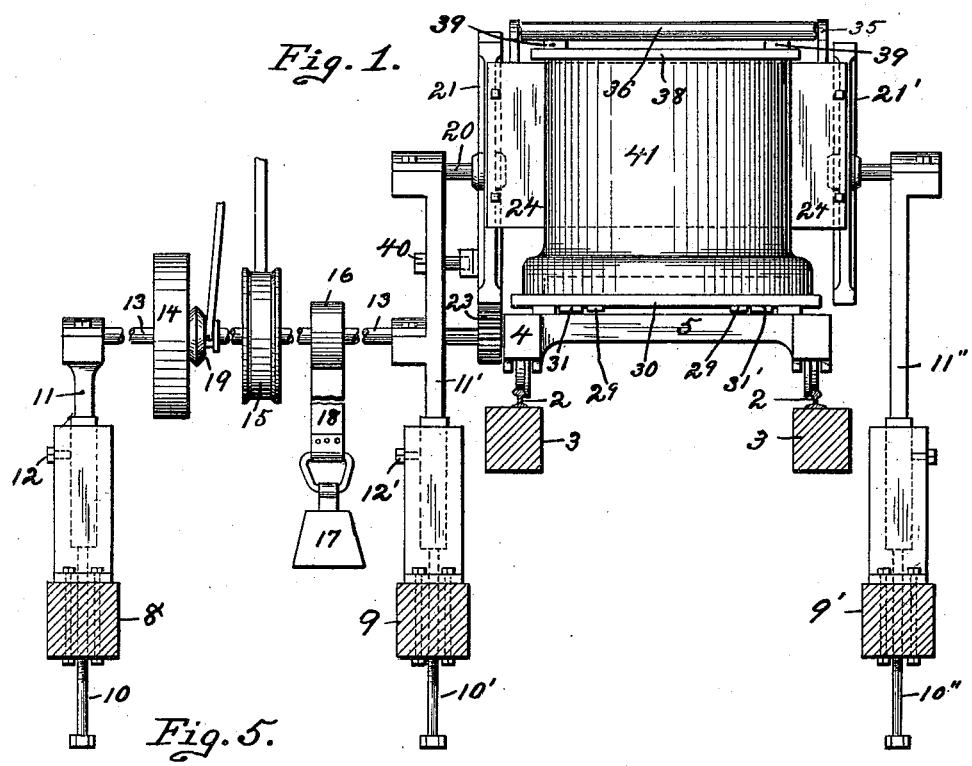
Figures 4, 5:
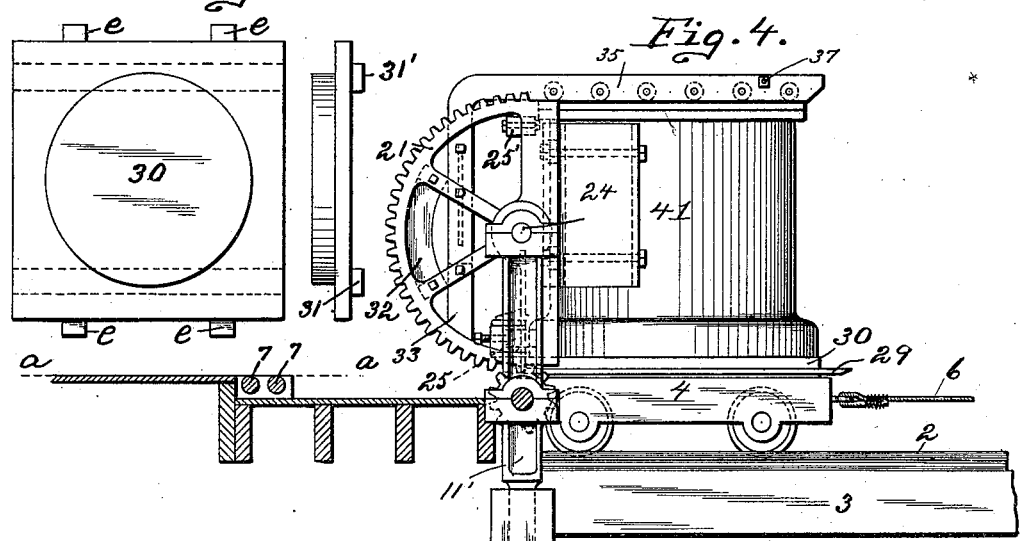

In the accompanying drawings, which make part of this specification, Figure 1 is an end view of my apparatus. Fig. 2 is a plan of the car by which the pipe is run in and out. Fig. 3 is a plan of palette-board. Fig. 4 is a side view of apparatus, showing pipe before it is turned. Fig. 5 is a plan and edge view of forming-board. Fig. 6 is an edge view of top roller-frame. Fig. 7 is a plan of same. Fig. 8 is a plan of cradle. Fig. 9 is a partial end view of apparatus, showing pipe half turned; and Fig. 10, a detail of one of the bars supporting the forming-board.

In the ordinary process of manufacturing clay pipe as practiced in this country the green pipe comes out of the press socket down. To permit the pipe to dry evenly, it requires to be reversed and to be stood on the spigot end. The manner of doing this was to support the bowl end of the pipe upon what is known as a "forming-board," which is substantially shown in Fig. 5, and the spigot was held by a palette-board. (Seen in Fig. 3.) A wooden cradle was then advanced by hand to receive the side of the pipe, and cradle, palette, and forming-board were all held by hand while the pipe was turned by hand-power through one hundred and eighty degrees. This process is awkward and exceedingly laborious and requires from two to four men to practice it, depending upon the weight of the pipe manipulated. The purpose of my invention is to turn the pipe by machine-power.

In the several views which make part of this specification, *a a* shows the floor-line of the works.

2 2 are rails placed upon suitable girders 3 3 below the level of the main floor. Upon said rails runs a car (seen in Fig. 2) having side frames 4 4 and cross-frame 5, leaving the car open at one end. Said car is pulled back and forward by cables 6 6. 7 7 are rollers set in the floor, whose function will be explained later. Below girders 3 3 are placed supports 8 9 9'. In support 8 works adjusting-screw 10, which can move vertically housing 11, preferably six inches. Housing 11, when adjusted, is held by set-screw 12, and supports one end of main driving-shaft 13, which carries main belt-pulley 14, brake-pulley 15, and back balance-pulley 16, having weight 17, attached thereto by band 18, which wraps around pulley in several folds. Main belt-pulley is thrown off and on by clutch 19. In support 9 turns adjusting-screw 10', which determines the vertical adjustment of housing 11', having set-screw 12'. Housing 11' affords a bearing both for main driving-shaft 13 and short shaft 20 in hub of segmental gear 21. Support 9' has a similar adjusting-screw 10'', which determines the vertical adjustment of housing 11'', which acts as bearing for segment 21'.

23 is the pinion on main driving-shaft 13, meshing with segmental gear 21.

24 is a cradle, preferably made of wood and clearly seen in Figs. 8 and 9. The wooden part for receiving the body of the pipe can be changed so as to receive any pipe from thirty inches to ten inches. It is bolted to lugs *c c* on inside of segmental gears 21 and segment 21'. 25 is a cross-bar between said segments, and is similarly bolted to lugs *d d* on the inside of segments. Upon said cross-bar 25 slides block 26, adjustable by set-screw 27 and having stirrups 28 28', which embrace bar 29, which supports forming-board 30. Stirrups 28 28' are also adjustable along bar 29. Forming-board 30 is like the ordinary forming-board, except that it has lugs *e e* to rest upon side frames of car. It has the usual cleats 31 31'. A like brace-bar 25' connects the two segments at or near the top.

The segments are made for lightness with spider-bodies, and bolted to same are counterweights, one of which is seen at 32; also bolted to said segments are two vertical bars, one of which is seen at 33, to which are secured by set-screws short arms, one of which is seen at 34, of palette-board roller-support. (Seen in Figs. 6 and 7.) Said short arms have adjustment-slots *s s*. The long arms, one of which is seen at 35, of this support have rollers 36 36 journaled therein, and these arms are connected by tie-rod 37.

38 is the palette-board, the same as the ordinary board and having cleats 39 39.

40 is a bolt by which a stop is secured behind housing 11' to engage a like stop on segmental gear 21 and prevent further rotation thereof when the cradle moves back under the influence of the back balance-weight 17.

41 is the clay pipe itself.

The operation of the device, including preliminary steps, is as follows: The pipe is cast in the usual way upon the forming-board 30, which rests upon the rod of the usual lifting-table. The open-ended car (seen in Fig. 2) is then run to such a position that the lifting-rod is at about the center of the open frame. The table is then lowered until the lugs *e e* of forming-board rest upon sides of car. The car is then run from beneath the press by power. The top of the pipe is then cut off in the ordinary way and the palette-board 38 placed on its top with cleats 39 uppermost. Power is then applied to the car, and the pipe is pulled into the cradle 24, which is standing in the position seen in Fig. 4. As the pipe is pulled toward the cradle, bars 29 29' slip beneath the forming-board 30, which stands up sufficiently for this purpose, owing to cleats 31 31'. Simultaneously the palette-board roller-frame rides over the palette-board, where I prefer to have a clearance of about an eighth of an inch. The pipe now rests in what might be termed a "three-sided support" formed of cradle, forming-board, and palette-board. Power is then applied through clutch 19, and cradle rocked over backward, the weight of the forward part of the apparatus being largely counterbalanced by counterweights 32 32. After the pipe has reached a horizontal position, as seen in Fig. 9, the downward movement through the remaining arc of ninety degrees is regulated by brake 15 with such nicety and exactness that the pipe can finally be rested upon its spigot end without any perceptible shock.

It should be carefully noticed that the pipe at no time in its semirotation has been clamped in its supports, but has been simply in a position of loose contact. No strain, therefore, has been brought to bear upon the pipe nor any time lost in setting up and undoing clamps. When the pipe has been completely turned, I run an ordinary hand-truck, provided with the usual forks, beneath the palette-board, which is now undermost, and speedily withdraw the pipe, the rollers 7 7 in the floor assisting in its easy movement. As soon as the palette-board and forming-board, with the inclosed pipe, are clear of the machine, it quickly automatically rocks back to the position seen in Fig. 4, through the agency of the back balance-weight 17, and is immediately ready to receive another piece. By means of set-screws 10, 10', and 10" the machine has a vertical range of about six inches, and as it is belt-driven no harm is done by this difference in alinement. Also another six inches of vertical movement is secured by slots *s s* in arms 34 34 of palette-board frame. Lateral adjustment is further secured by moving blocks 26 26, so that my apparatus is adapted to the varying diameters and length of all commercial sizes of pipe.

This machine has been in practical and highly successful operation for some time prior to the execution of this application.

I have described my invention in detail with the precise construction of parts which I consider most desirable. It should not, however, be assumed from this that I intend my claims to be limited to the exact constructions illustrated and described.

I am well aware that in a machine of this complexity radical changes may be made in framework, driving mechanism, &c., by any skilled designer, while still appropriating the vital points of my invention. I therefore do not wish the broad language of my claims to be limited by implications to merely mechanical details.

Having minutely described my machine and its operation, I claim—

1. In a pipe-turner, a cradle, extensions from each end of the cradle forward from its face; power mechanism for placing the pipe in said cradle and between said extensions and power mechanism for rotating the cradle, as and for the purpose set forth.

2. In a pipe-turner, a cradle, extensions from the lower end of the cradle forward from its face, a roller-frame extending from the upper end of the cradle forward from its face, power mechanism for placing the pipe in said cradle and between said extensions and power mechanism for rotating the cradle, as and for the purpose set forth.

3. In a pipe-turner, a cradle, adjustable extensions from each end of the cradle in front of its face and means for rotating the cradle and extensions, as and for the purpose set forth.

4. In a pipe-turner, a cradle, extensions from each end of the cradle in front of its face and means for vertically adjusting and rotating the cradle and extensions, as and for the purpose set forth.

5. In a pipe-turner, a cradle, extensions from each end of the cradle in front of its face, means for rotating the cradle and extensions, a forming-board having cleats on its under side to permit of the introduction of the extensions on the lower end of the cradle and an open-ended car on which the forming-board rests, as and for the purpose set forth.

6. In a pipe-turner, a cradle, extensions from each end of the cradle in front of its face, means for rotating the cradle and extensions and a back balance-weight to return the cradle to its position after the delivery of the pipe, as and for the purpose set forth.

In testimony whereof I have hereunto set my hand this 11th day of October, A. D. 1895.

SAMUEL McADOO.

Witnesses:
SAMUEL S. MEHARD,
WM. L. PIERCE.